United States Patent
Yeo et al.

(10) Patent No.: US 8,711,484 B2
(45) Date of Patent: Apr. 29, 2014

(54) FABRICATION OF THIN PELLICLE BEAM SPLITTERS

(75) Inventors: Jong-Souk Yeo, Corvallis, OR (US);
Sagi V. Mathai, Berkeley, CA (US);
Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 28 days.

(21) Appl. No.: 12/991,106

(22) PCT Filed: May 6, 2008

(86) PCT No.: PCT/US2008/062794
§ 371 (c)(1),
(2), (4) Date: Nov. 4, 2010

(87) PCT Pub. No.: WO2009/136914
PCT Pub. Date: Nov. 12, 2009

(65) Prior Publication Data
US 2011/0063733 A1 Mar. 17, 2011

(51) Int. Cl.
*G02B 27/14* (2006.01)
*G02B 26/00* (2006.01)
*G02B 27/12* (2006.01)

(52) U.S. Cl.
USPC ............................ 359/629; 359/237; 359/639

(58) Field of Classification Search
USPC .................. 359/629, 227, 237, 630, 634, 639
See application file for complete search history.

(56) References Cited

U.S. PATENT DOCUMENTS

| | | | |
|---|---|---|---|
| 3,515,480 A * | 6/1970 | Korones et al. | 356/5.01 |
| 5,900,975 A | 5/1999 | Sussman | |
| 6,525,884 B2 * | 2/2003 | Kraiczek et al. | 359/629 |
| 6,593,035 B1 | 7/2003 | Levinson et al. | |
| 6,623,893 B1 | 9/2003 | Levinson et al. | |
| 6,967,776 B2 | 11/2005 | Muraguchi et al. | |
| 2002/0075567 A1 | 6/2002 | Kraiczek et al. | |
| 2004/0070833 A1* | 4/2004 | Sargent et al. | 359/577 |
| 2004/0126671 A1 | 7/2004 | Smith et al. | |
| 2004/0246591 A1* | 12/2004 | Kozlovsky et al. | 359/639 |
| 2005/0151368 A1* | 7/2005 | Heim | 283/72 |
| 2010/0296165 A1* | 11/2010 | Tan et al. | 359/583 |

FOREIGN PATENT DOCUMENTS

| | | |
|---|---|---|
| DE | 10013261 | 10/2001 |
| JP | 1990-071198 | 3/1990 |
| JP | 1990-306202 | 12/1990 |
| JP | H02306202 | 12/1990 |
| JP | 1992-351998 | 12/1992 |
| JP | 1998-012526 | 1/1998 |

(Continued)

OTHER PUBLICATIONS

Translation of JP 1998-012526.*

(Continued)

*Primary Examiner* — Dawayne A Pinkney

(57) ABSTRACT

A method for fabricating a pellicle beam splitter includes etching an aperture in a support substrate; bonding a beam splitter substrate to an upper surface of the support substrate so that the beam splitter substrate covers the aperture; and depositing at least one optical coating on the beam splitter substrate. A pellicle beam splitter includes a support substrate, an aperture created in the support substrate using a semiconductor fabrication processes and a beam-splitting coating covering the aperture.

20 Claims, 11 Drawing Sheets

(56) References Cited

FOREIGN PATENT DOCUMENTS

| | | |
|---|---|---|
| JP | 1998-020095 | 1/1998 |
| JP | 1998-270314 | 10/1998 |
| JP | 2883100 | 4/1999 |
| JP | 2011-511315 | 4/2011 |
| WO | WO-9609183 | 3/1996 |
| WO | WO-2007/077795 | 7/2007 |
| WO | WO-2007/123744 | 11/2007 |

OTHER PUBLICATIONS

Translation of JP 1998-270314.*

Azzam, Rasheed M. A. et al., "Symmetrically coated pellicle beam splitters for dual quarter-wave retardation in reflection and transmission", Applied Optics. Jan. 1, 2002, vol. 41, No. 1, pp. 235-238.

Extended European Search Report (Feb. 24, 2012), EP Application No. 08755090.1, Filed Oct. 29, 2010.

Gupta, K., "Micromachined Polarization seam Splitters for the Visible Spectrum", Aug. 18-21, 2003, IEEE/LEOS international Conference on Optical MEMS and Their Applications, Technical Digest, pp. 171-172, Kona, Hawaii.

International Search Report (Oct. 30, 2008), PCT Application No. PCT/US2008/052794, Filed May 6, 2008.

Extended EP Search Report, Jan. 2, 2013, EP Application No. 12193927.6.

* cited by examiner

FABRICATION OF THIN PELLICLE BEAM SPLITTERS

BACKGROUND

Beam splitters are used in a wide variety of photonics applications to separate or combine optical energy. Beam splitters use a partially reflective surface to reflect a portion of incident light while allowing the remainder to be transmitted through the beam splitter. However, many beam splitter configurations use beam-splitting coatings deposited on a relatively thick substrate. This thick substrate can lead to stray reflections, ghosting, beam offsets, undesirable optical interference, and other issues.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As noted above, beam splitters are used in a wide variety of photonics applications to separate or combine optical energy. Beam splitters use a partially reflective surface to reflect a portion of incident light while allowing the remainder to be transmitted through the beam splitter. For example, beam splitters allow a small portion of a primary optical beam to be diverted for measurement, while allowing the remainder of the optical beam to continue through the optical system.

In many applications, beam splitters must be precisely constructed to obtain the desired split ratios, low losses, temperature stability, and proper polarization properties. A common method of creating a beam splitter uses dielectric interference filters to split the incident light. Also, a variety of other types of beam splitting methods can be used.

By way of example and not limitation beam splitting layers may include a thin metallic layer, polka-dot metallic structures, sub-wavelength apertures, and many other optical coatings. While dielectric interference filters or other beam splitter layers provide most of the desired optical characteristics, they are typically deposited on a thick substrate. The thick substrate maintains the mechanical integrity of the beam splitter and avoids stresses that would induce cracking, buckling, or bending of the optical coating. However, the thickness of the substrate results in several undesirable optical characteristics including higher optical losses due to absorption of the transmitted beam and offsets of the transmitted beam that can result in ghosting, alignment, and coupling issues.

By depositing beam-splitting coatings on thin substrates, these undesirable optical characteristics can be minimized. A beam splitter constructed with a very thin substrate, such as a stretched organic material or nitride membrane, is called a pellicle beam splitter. While pellicle beam splitters are suitable for a variety of free space applications, they can be unstable, difficult to construct, and fragile.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1:
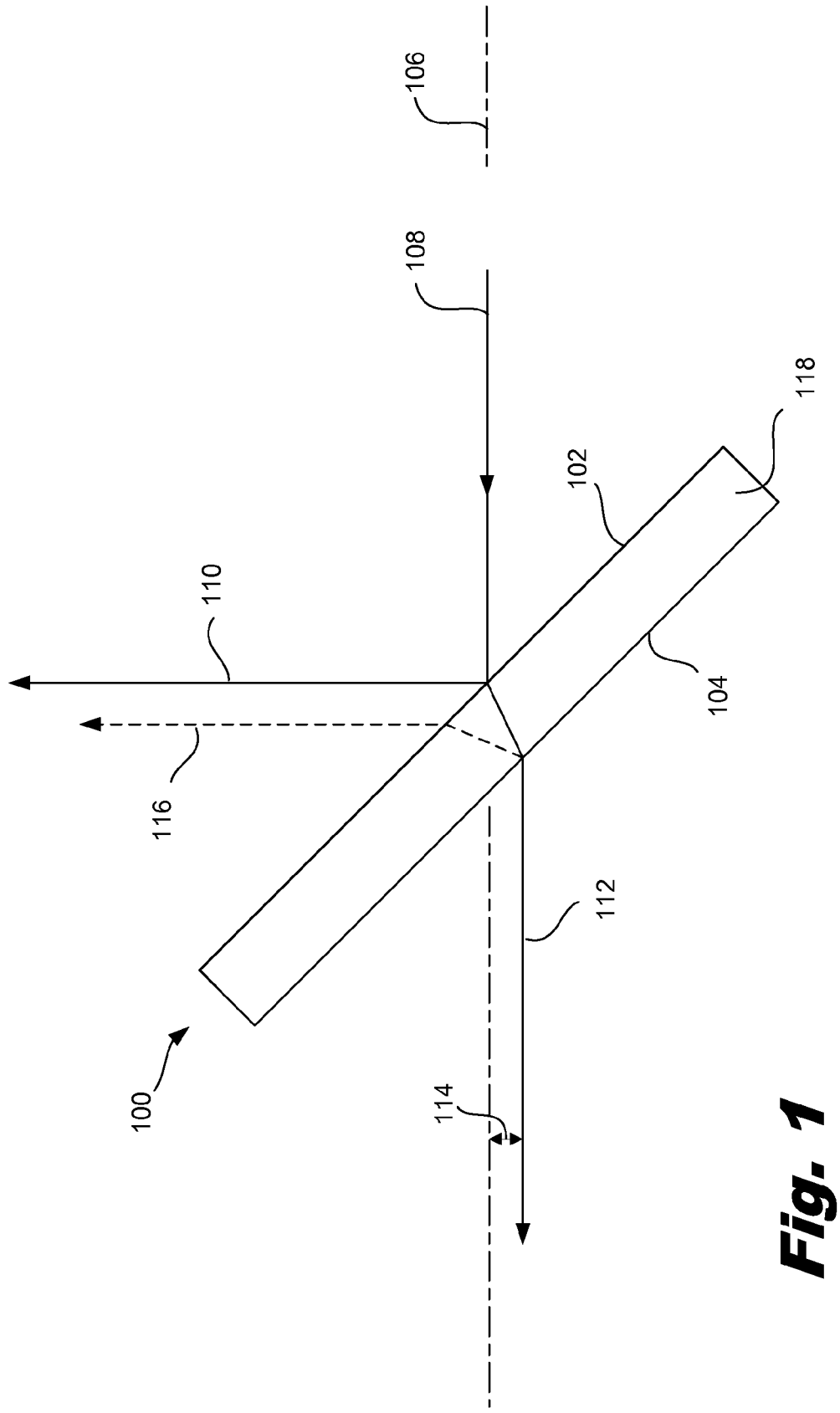
FIG. 1 is a diagram of one illustrative embodiment of a parallel plate beam splitter, according to principles described herein.

FIG. 1 is one exemplary embodiment of a conventional parallel plate beam splitter (100). In this example, the parallel plate beam splitter (100) includes a relatively thick substrate (118). The substrate (118) provides a mechanically and optically stable structure upon which optical coatings can be deposited. Typically, a parallel plate beam splitter will have a beam-splitting coating (102) on a first side of the substrate (118) and an anti-reflective coating (104) on the second side of the substrate (118). The incident beam (108) is shown traveling along a center line (106). The incident beam (108) strikes the beam-splitting coatings (102) and is divided into a reflected beam (110) and a transmitted beam (112).

In this embodiment, the reflected beam (110) is directed by the beam splitter (110) in a direction that is perpendicular to the incident beam. The amount of light in the reflected beam (110) and the direction of the reflected beam (110) are determined by the characteristics of the incident beam (108), the composition of the beam-splitting coatings (102), the angle at which the incident beam (108) strikes the beam splitter surface (102), and other factors.

A portion of the incident beam (108) passes through the beam-splitting coatings (102) and into the beam splitter substrate (118) as a transmitted beam (112). The direction of the transmitted beam (112) is altered as it passes through the beam splitter substrate (118). This is due to the refraction of the light at the interface between the surrounding medium and the beam splitter substrate (118). The transmitted beam (112) exits the beam splitter at the same angle the incident beam (108) entered the beam splitter but is offset from the center line as illustrated by the offset dimension (114). In some embodiments, this offset can cause excess loss of optical energy because the transmitted beam may become misaligned with the target waveguide.

Additionally, a portion of the transmitted beam (112) is reflected at the interface between the beam splitter substrate (118) and the surrounding medium. The antireflective coatings (104) attempt to minimize this undesirable reflection. However, at least a portion of the transmitted beam may be reflected back through the beam splitter substrate and exit parallel to, but offset from, the reflected beam (110). This undesirable reflection is called a ghost image (116). Other geometries of beam splitters that have substantial thickness, such as cube beam splitters, may have similar problems with surface reflections and internal interference.

Several of these undesirable characteristics can be minimized by using a pellicle beam splitter. A pellicle beam splitter is much thinner than a conventional plate beam splitter. Typically, a pellicle beam splitter uses a stretched membrane as a substrate. Beam splitting and antireflective coatings may be deposited on one or more surfaces of the membrane. Because the thickness of the pellicle beam splitter is very small, the offset between the ghost beam (116) and the reflected beam (110) can be substantially reduced. Similarly, the offset between the transmitted beam (112) and the incident beam (108) can be substantially reduced.

However, pellicle beam splitters have a variety of issues including adequate supporting the membrane that makes up the pellicle beam splitter. In addition to support issues, pellicle beam splitters can be fragile and sensitive to external vibration because of the delicate nature of the membrane.

Throughout the specification, the construction of a single optical component is illustrated. Those of skill in the art will understand that many similar features could be constructed in parallel using similar steps and processes.

Figure 2:
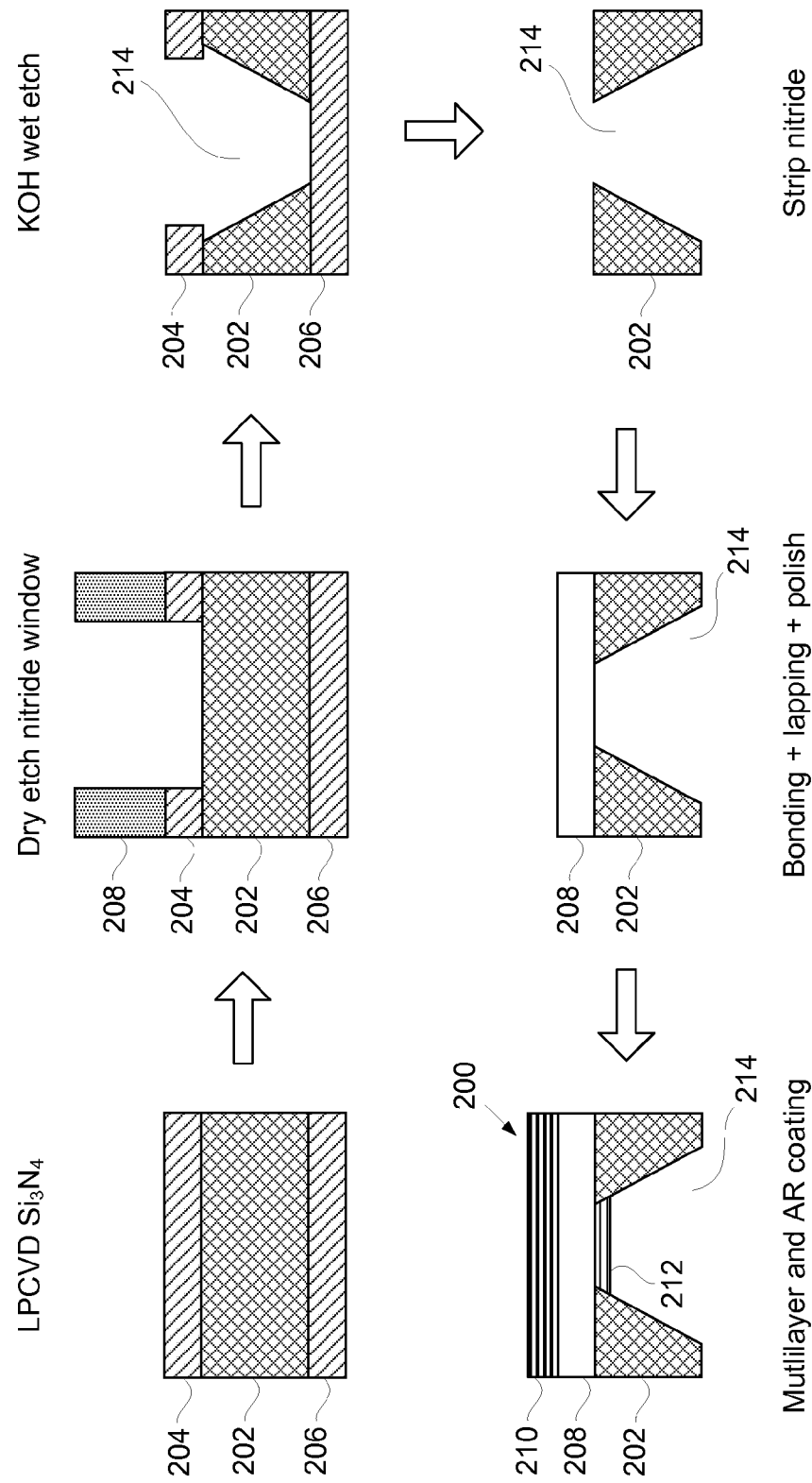
FIG. 2 is a diagram of an illustrative method for fabricating a pellicle beam splitter using lithographic processes, according to principles described herein.

FIG. 2 is an illustration of one exemplary method for producing a pellicle beam splitter using semiconductor fabrication techniques. In this illustrative embodiment, micro-scale pellicle beam splitters are constructed using proven substrate materials such as glass or other optical material. By way of example and not limitation, a glass substrate may be borosilicate glass such as BK7 optical glass, fused silica/fused quartz, sapphire, or other glasses. In some applications, it may be desirable to use other proven optical substrates such as germanium, zinc selenide, calcium fluoride, barium fluoride, magnesium fluoride, or other materials. These substrates are significantly more structural than membranes used as beam splitter substrates in conventional pellicle beam splitters.

Semi conductor fabrication techniques used to construct the pellicle beam splitter may include deposition, material removal, masking, bonding, handling, doping, cleaning, coating, and other techniques. According to one exemplary embodiment, the process begins with the low-pressure chemical vapor deposition (LPCVD) of silicon nitride ($Si_3N_4$) layers (204, 206) as a hard mask layer on a support substrate (202). In its final form, the support substrate (202) provides a mechanical structure that increases the robustness of the pellicle beam splitter and allows it to be safely handled. According to one illustrative embodiment, the support substrate (202) may be a double-sided polished silicon substrate.

Low pressure chemical vapor deposition is a chemical process used to produce high purity thin films. The support substrate (202) is exposed to one or more volatile precursor chemical compounds which react and/or decompose on the substrate surface to produce the desired film. In low pressure chemical vapor deposition, this process is performed at sub-atmospheric pressures to reduce unwanted gas phase interactions and improve the uniformity of the film across the support substrate (202). Mask materials and processes are not limited to examples described herein but may include a variety of suitable materials and processes that withstand wet or dry etch processes. By way of example and not limitation, these materials and processes may include deposition of dense silicon oxide, low stress silicon nitride, metallic layers, and polymeric layers.

In a second step, photoresist (208) is applied to the top surface of the upper silicon nitride layer (204). Photoresist is a light sensitive material used to form a patterned coating on the surface. According to one exemplary embodiment, a negative photoresist is used. Portions of the negative photoresist layer (208) are exposed to ultraviolet light. The ultraviolet light cures the portions of the photoresist it strikes. The cured areas of the photoresist layer (208) become relatively insoluble to a photoresist developer. The photoresist developer then dissolves the uncured portions of the photoresist layer (208), leaving a pattern (or mask) of cured photoresist on the top surface of the silicon nitride layer (204). The silicon nitride layer (204) is then dry etched to expose a portion of the underlying silicon substrate (202) through a window in the silicon nitride layer (204). Dry etching refers to the removal of exposed material by bombardment with ions that dislodge portions of the exposed material. The cured photoresist (208) is then chemically removed.

In an alternative embodiment, the hard mask layer (204, 206) may be patterned without the use of photoresist (208). In this embodiment, the hard mask layer (204, 206) is removed with laser micromachining or similar processes. In laser micromachining, a focused laser beam is scanned across the hard mask layer (204, 206). The intensity of the laser is above the ablation threshold of the mask material (204, 206). By controlling the number of scans or pulses, hard mask (204, 206) is selectively removed to expose a portion of the underlying substrate.

In the third step, a chemical etching process is used to remove portions of the exposed substrate (202). According to one exemplary embodiment, a potassium hydroxide (KOH) wet etch is used to remove portions of the silicon substrate (202) exposed through the windows in the upper silicon nitride layer (204). Various parameters can be controlled during the wet etch to obtain the desired geometry. For example, the depth of the cavity may be controlled by the length of time the etching chemical is in contact with the substrate material. The distance of the undercut (or bias) can be controlled by selecting an etchant with the desired isotropic or anisotropic characteristics. According to one exemplary embodiment, the lower silicon nitride layer (206) resists the potassium hydroxide wet etch and protects the lower surface of the silicon substrate. In this example the potassium hydroxide wet etch creates an aperture (214) that passes through the entire thickness of the silicon substrate, with the upper opening being the wider than the lower opening. Those skilled in the art will appreciate that the final geometry of the aperture depends on the crystal orientation of the silicon substrate (202), the thickness of the silicon substrate (202), and the window opening in the upper silicon nitride layer (204). In addition, those skilled in the art will be aware of other wet etchants, such as tetramethylammonium hydroxide (TMAH) or dry etching approaches that may be used in place of potassium hydroxide.

In a fourth step, the silicon nitride layers (204, 206) are removed from the silicon substrate (202). In a fifth step, a glass substrate (208) is bonded to the silicon substrate (202). The glass substrate (208) is then resurfaced. According to one exemplary embodiment, the resurfacing may comprise grinding, lapping, and polishing processes that achieve the desired thickness of the glass substrate (208), surface figure and finish.

In a sixth step, the beam-splitting coatings (210) and the antireflective coatings (212) are deposited on the upper and lower surfaces of the glass substrate (208). According to one exemplary embodiment, the beam-splitting coatings (210) may be comprised of multiple layers of different optical films with varying compositions and thickness.

In this manner, micro-scale pellicle beam splitters can be constructed that would be particularly suitable for fiber optic or waveguide applications. According to one exemplary embodiment, the pellicle beam splitter (200) may be constructed in situ as an integrated part of a larger optical system. In alternative embodiment, the various pellicle beam splitters (200) constructed on a silicon wafer may be singulated into discrete components and mechanically placed into the desired location within an optical system.

Figure 3:
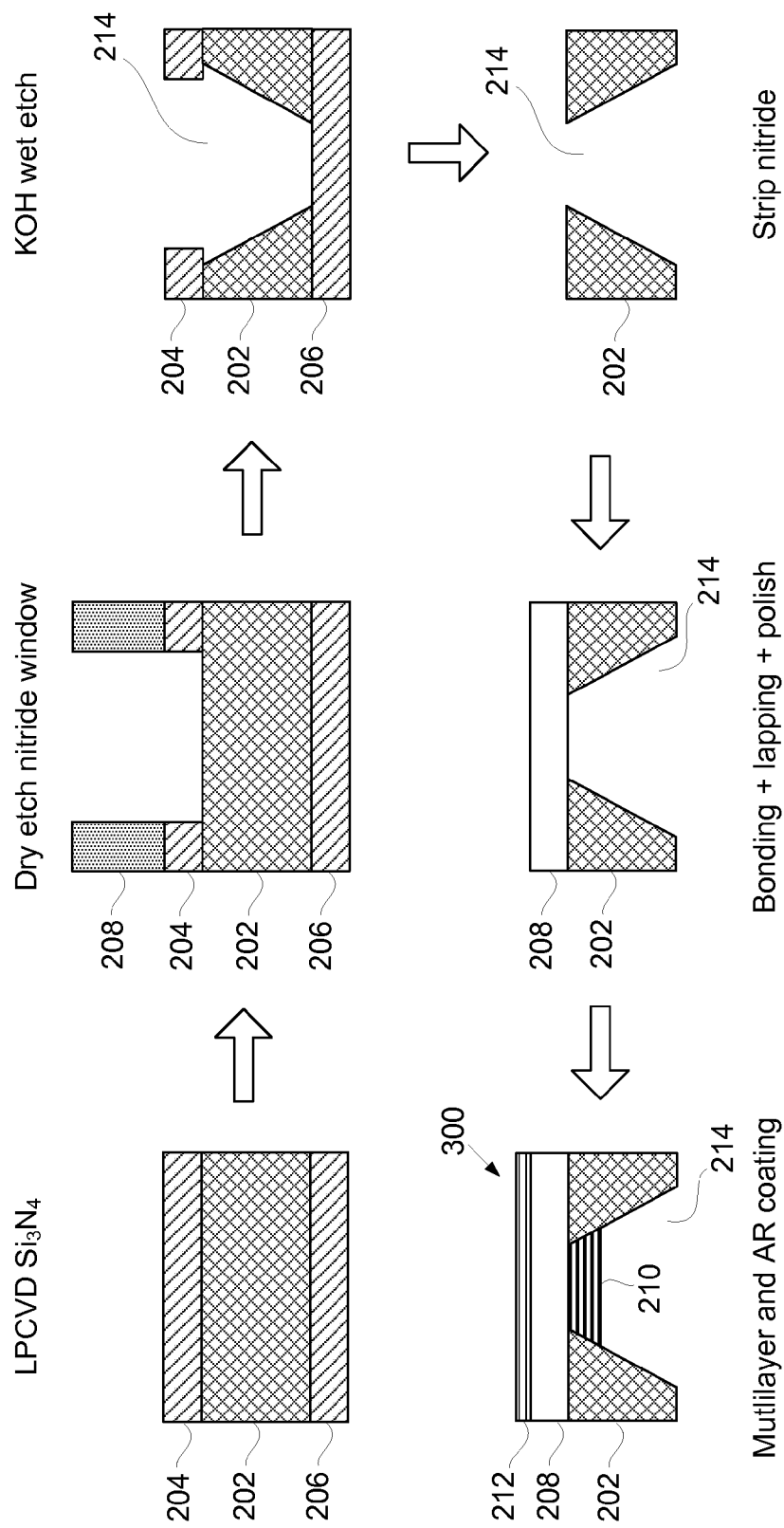
FIG. 3 is a diagram of an illustrative method for fabricating a pellicle beam splitter using lithographic processes, according to principles described herein.

FIG. 3 illustrates an alternative arrangement for placing the multi-layer and antireflective coatings. Similar to FIG. 2, silicon nitride layers (204, 206) are deposited on a silicon substrate (202). The silicon nitride upper layer (204) is dry etched to form a window which exposes the underlying silicon substrate. The potassium hydroxide wet etch forms an aperture (214) in the underlying silicon substrate (202). The nitride layers (204, 206) are then stripped from the silicon substrate (202). The beam splitter substrate (208) is then bonded to the silicon substrate (202). As discussed above, the beam splitter substrate (208) and silicon substrate (202) may be lapped and polished to achieve the desired surface figure required for the beam splitter application.

In this illustrative embodiment, the antireflective coatings (212 are deposited on the upper surface of the glass substrate (208) and the beam-splitting coatings (210) are deposited on the lower surface of the glass substrate (208). Normally it is desirable for the incident beam to strike the beam-splitting coatings first so that the reflected beam is not required to pass through the beam splitter substrate (208). The remaining light would be transmitted through the beam-splitting coatings (210) and into the beam splitter substrate (208). Ideally 100% of this transmitted beam would exit through the antireflective coatings (212). In applications where the incident beam approaches the beam splitter (300) from the silicon substrate side, this configuration could be advantageous.

Figure 4:
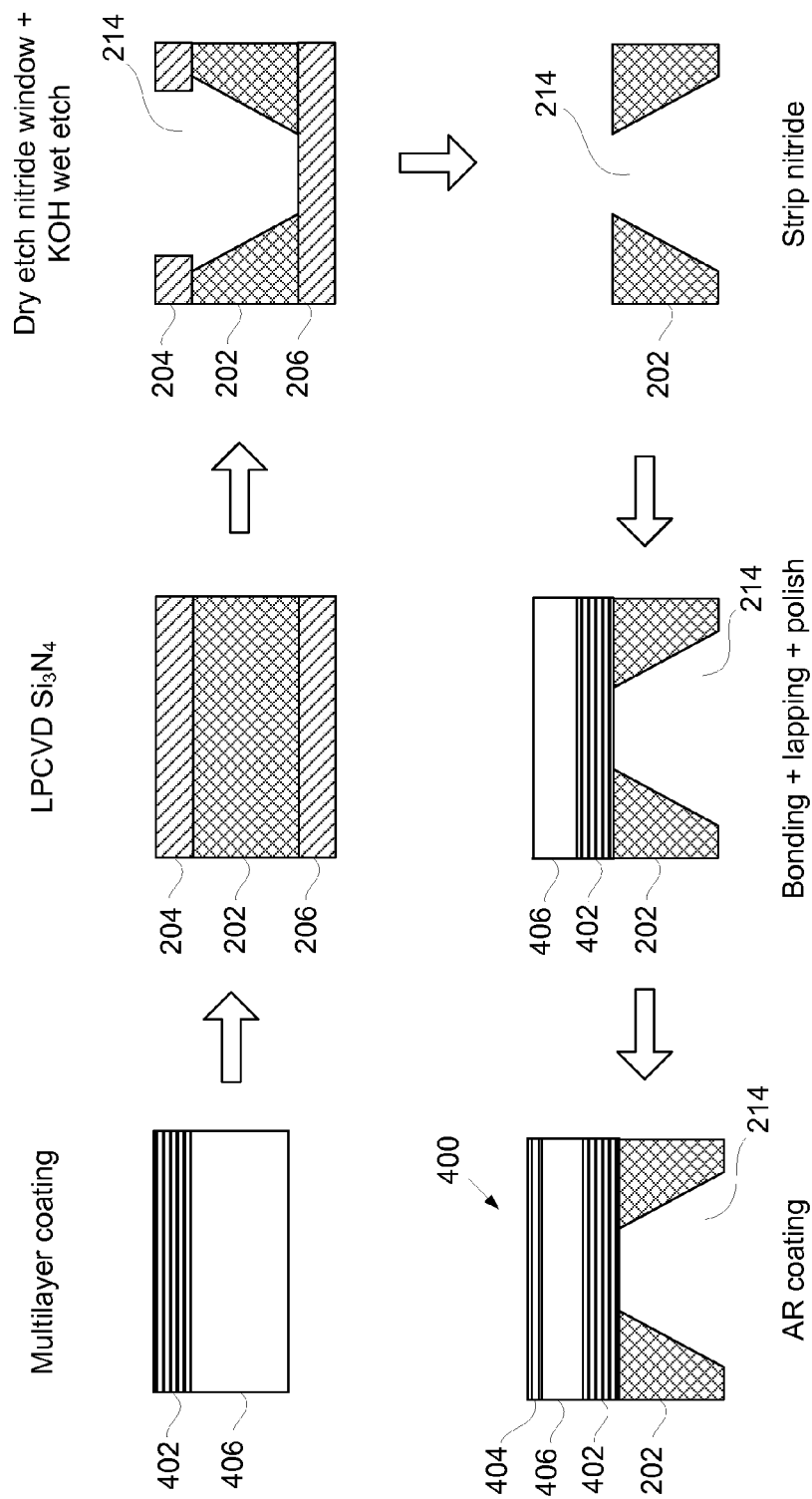
FIG. 4 is a diagram of an illustrative method for fabricating a pellicle beam splitter using lithographic processes, according to principles described herein.

FIG. 4 describes an alternative method for creating a pellicle beam splitter (400) using semiconductor fabrication techniques. According to one exemplary embodiment, the beam splitter substrate (406) is coated with the beam-splitting coatings (402) prior to being bonded to the silicon substrate (202). The silicon substrate (202) is then coated with silicon nitride using low-pressure chemical vapor deposition to form an upper layer (204) and a lower silicon nitride layer (206). As previously described, a photoresist mask can be used to dry etch a silicon nitride window that exposes the underlying silicon substrate (202). A wet etch can then be used to create an aperture (214) in the silicon substrate (202). The silicon nitride layers (204, 206) are then stripped from the silicon substrate (202). The beam splitter substrate (406) together with the deposited beam-splitting coatings (202) are then bonded to the silicon substrate (202). Following any further lapping and polishing that is desired, the antireflective coating (404) can be deposited on the upper surface of the glass substrate (406).

Figure 5:
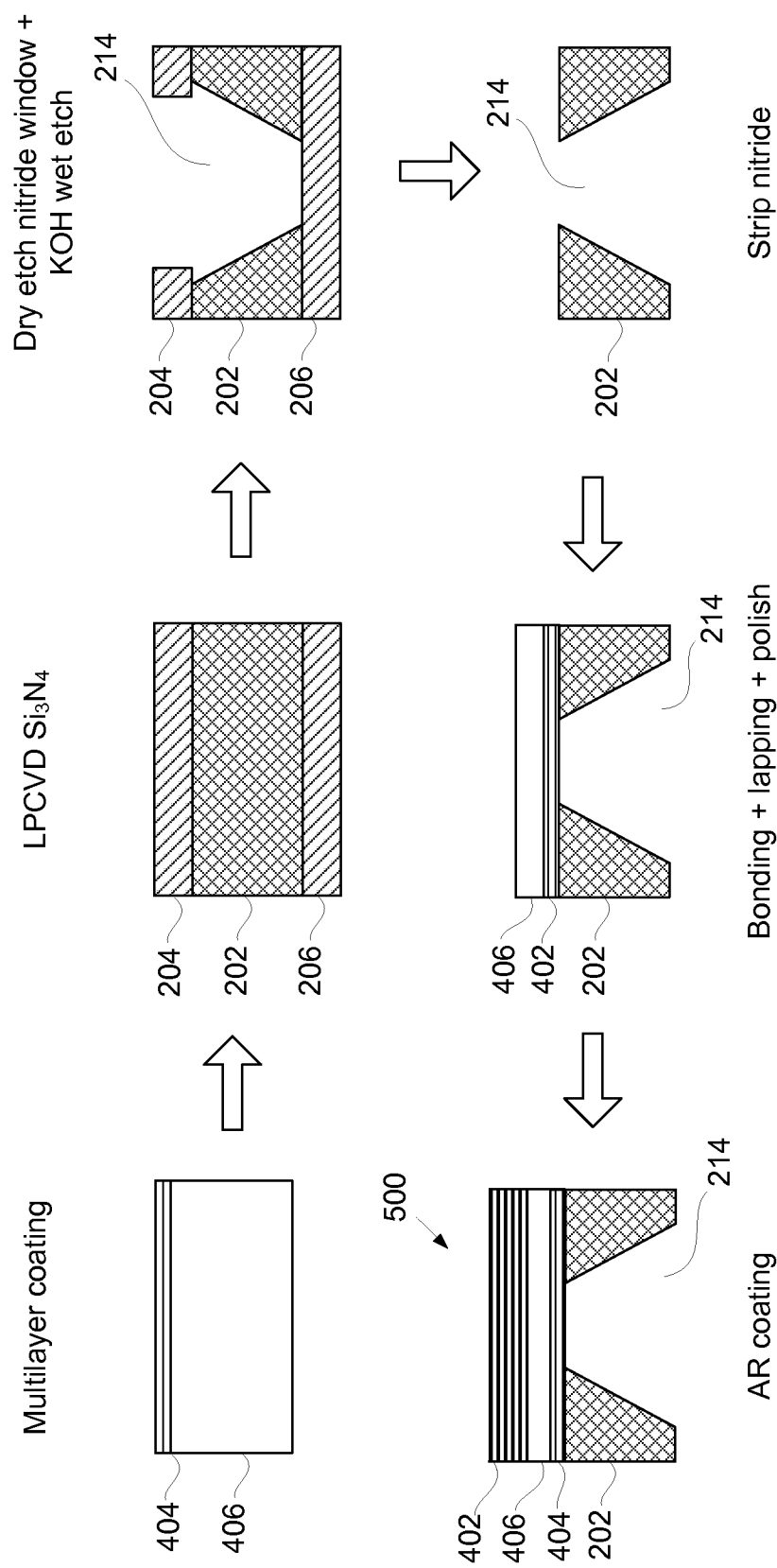
FIG. 5 is a diagram of an illustrative method for fabricating a pellicle beam splitter using lithographic processes, according to principles described herein.

FIG. 5 shows a pellicle beam splitter (500) in which the positions of the beam-splitting coatings (402) and the antireflective coatings (404) are reversed. The antireflective coatings (404) are deposited on the support substrate (406). The apertures in the silicon substrate (202) are formed in a manner substantially similar to that previously described. Following the creation of the apertures, the support substrate (406) is bonded to the silicon substrate with the antireflective coatings (404) down. The support substrate (406) is then lapped/ground to the desired thickness and polished to achieve the desired surface finish. The beam-splitting coatings (402) are then deposited through the aperture onto the lower surface of the support substrate (406).

Figure 6A:
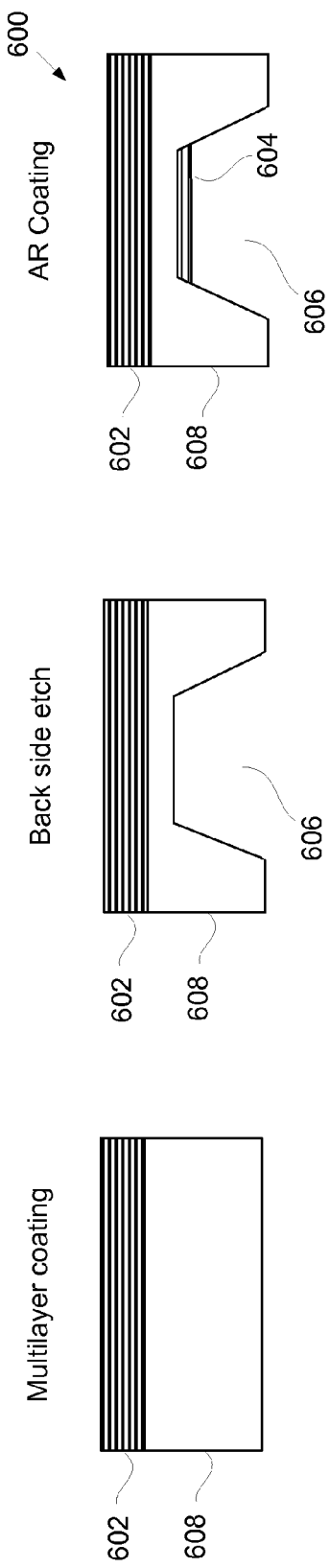
FIGS. 6A and 6B are diagrams of illustrative methods for fabricating a pellicle beam splitter on a unified substrate, according to principles described herein.

FIG. 6A shows a method for creating a pellicle beam splitter (600) using a unified substrate (608). According to this illustrative embodiment, a unified substrate (608) serves the function of both the support substrate (see e.g., 202, FIG. 2) and the beam splitter substrate (see e.g., 208, FIG. 2). The upper surface of the unified substrate (608) is lapped and polished to the desired surface figure and finish. The beam-splitting coatings (602) are then deposited on the upper surface of the unified substrate (608).

In a second step, the back side of the unified substrate (602) is etched to form an indentation (606). According to one exemplary embodiment, the bottom of the indentation (606) is substantially planar and the antireflective coatings (604) are deposited in the bottom of the indentation (606). Because a portion of the optical energy that is incident on the beam splitter passes through the substrate (608), the substrate (608) is at least partially transparent at the wavelength of the target optical energy.

This structure can be made with a unified substrate (608) composed of photosensitive glass. The fabrication process involves exposing the photosensitive glass to ultraviolet light. By way of example and not limitation, a one millimeter thick FOTURAN® photosensitive glass substrate can be patterned using the following steps.

First, a mask is used to cover the portions of the substrate that will remain resistant to the etching process. According to one exemplary embodiment, the mask may be made of a chromium layer.

Next, the unmasked portions of photosensitive glass substrate are exposed to ultraviolet light with a wavelength between 290 nm and 330 nm and an energy density above 2 $J/cm^2$. According to one exemplary embodiment, the energy density of the ultraviolet light may be 20 $J/cm^2$. The UV light may be applied using a variety of methods including mercury lamps or a scanning UV laser.

In a third step, the photosensitive glass substrate is heat treated at 500-600 C for several hours. The exposed areas of the photosensitive glass substrate crystallize during the heat treatment and have an etch rate that is up to 20 times higher than unexposed regions. The etchant solution is then applied. According to one exemplary embodiment, the etchant is a 10% solution of hydrofluoric acid at room temperature and produces an etch rate of approximately 10 um/min. This etch rate is influenced by a variety of factors including temperature, material composition, material structure, chemical composition, and other factors. This process can be used to create the indentation (606) or other structures formed in the unified substrate (608).

Figure 6B:
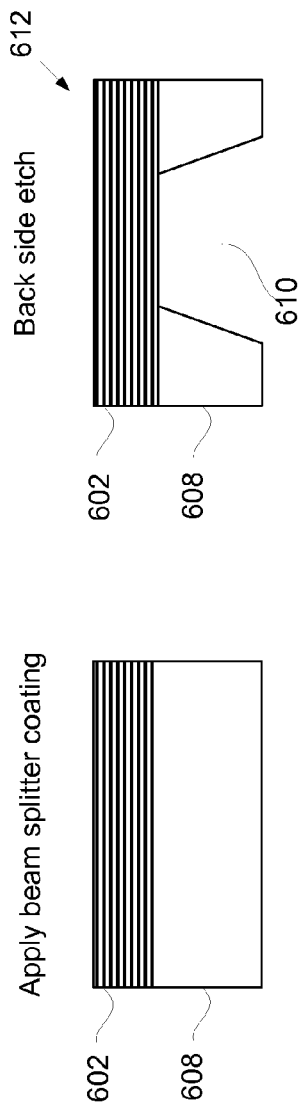

In an alternative embodiment illustrated in FIG. 6B, a beam splitter (612) is made up of beam-splitting coatings (602) which span an aperture (610) in the unified substrate (608) without additional support. In a first step, the beam-splitting coating (602) is applied to the unified substrate (608). An etching process is used to create an aperture (610) that passes through the thickness of the unified substrate (608). The etching process does not disturb the beam-splitting coating (602). For example, the etching time of the process may be controlled so that the beam-splitting coating is not disturbed or a stop etch layer may be incorporated to prevent the etching process from damaging the beam splitter. The beam-splitting coating (610) itself becomes the entire beam splitting element. No supporting beam splitter substrate is required. Further, no anti-reflection coatings are required because the beam-splitting coating is designed to work alone and the transmitted portion of the incident light does not interact with a second surface.

It will be appreciated that the principles described can be applied using a variety of methods and processes, only a portion of which are described. For example, hard mask layers could be applied to both sides of a silicon substrate. A first hard mask layer is etched to form the desired pattern of windows. A wet etch process is then used to create the desired apertures or indentations in the silicon substrate. The second hard mask layer remains in place and serves as the support substrate for the multilayer beam-splitting coating. The first hard mask layer may or may not be removed after the desired windows are formed.

Figure 7A:
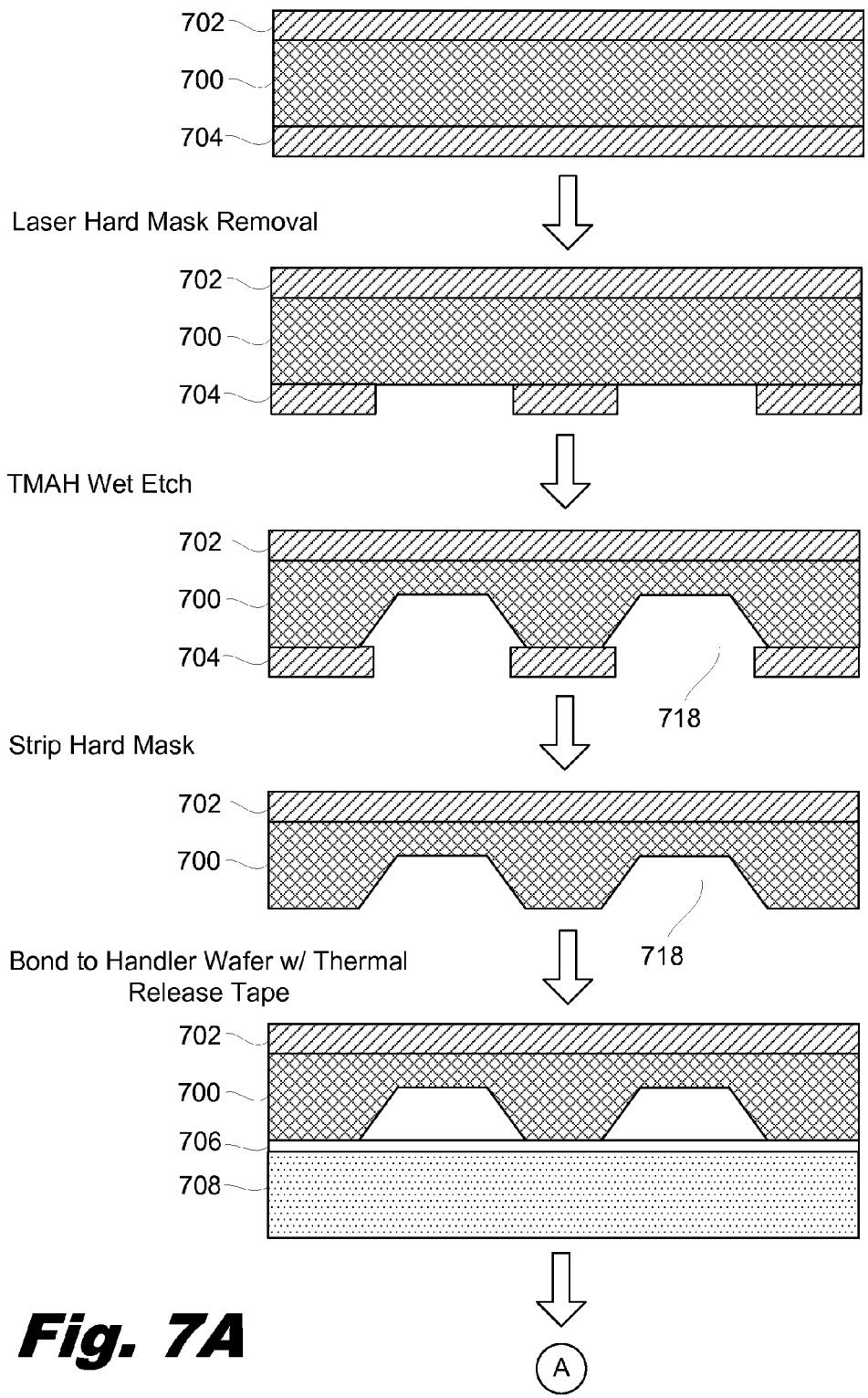
FIGS. 7A and 7B are diagrams of illustrative methods for fabricating a pellicle beam splitter using lithographic processes, according to principles described herein.
Figure 7B:
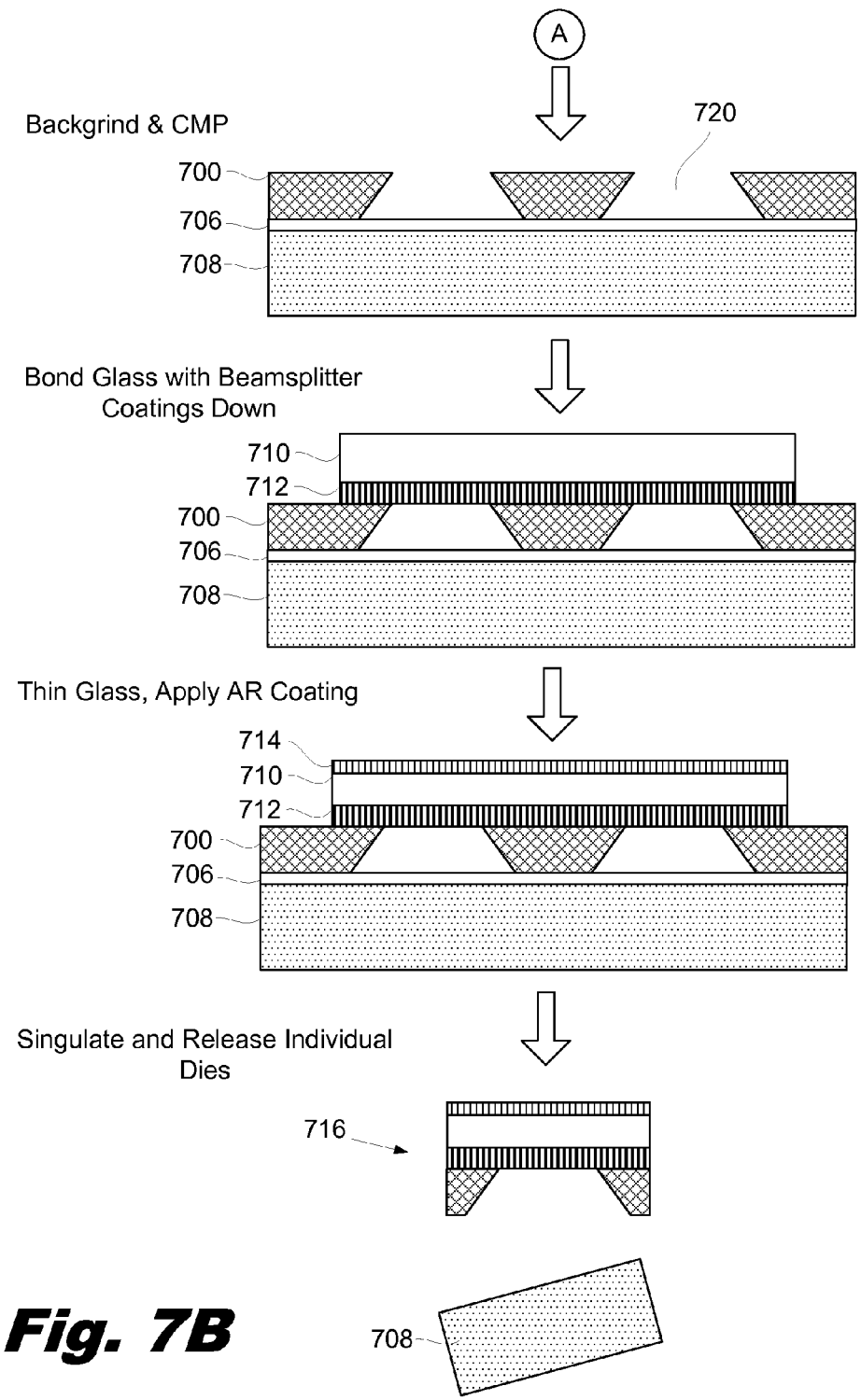

FIGS. 7A and 7B show an alternative method for creating pellicle beam splitters using semiconductor fabrication processes. In a first step, hard mask layers (702, 704) are deposited on a support substrate (700). According to one exemplary embodiment, the hard masks are deposited using low-pressure chemical vapor deposition (LPCVD) of an oxide or silicon nitride material. The support substrate (700) may be any one of a number of suitable materials, including silicon. For example, the substrate (700) may be a four or eight inch diameter silicon wafer.

In a second step, a laser is used to remove portions of the lower hard mask layer (704). This creates a number of windows through the hard mask layer (704) and exposes portions of the support substrate (700). A wet etch is then performed to create indentations (718) into the substrate (700). According to one exemplary embodiment, tetramethylammonium hydroxide (TMAH) is used as an anisotropic etchant of the silicon substrate (700). Next, one or more of the hard mask layers (702, 704) are stripped from the support substrate (700). The support substrate (700) is then bonded to a handler wafer (708). By way of example and not limitation, the support substrate (700) may be bonded to the handler wafer (708) using thermal release tape, water soluble wax, or similar temporary bonding means that allow handling of thin wafers through the remaining process steps.

Now referring to FIG. 7B, the handler wafer (708) is used to support the substrate (700) through various back end processes such as back grinding and chemical mechanical polishing (CMP) processes. These grinding and polishing processes remove the upper hard mask layer (702) and thin the substrate (700) until the indentations (718) become apertures (720) through the substrate (700). According to one exemplary embodiment, the final thickness of the substrate is about 250 μm.

A glass beam splitter substrate (710) is then bonded to the upper surface of the substrate (700). According to one exemplary embodiment, the glass beam splitter substrate (710) has already been coated with multilayer beam-splitting coatings (712). FIG. 7B shows the glass beam splitter substrate (710) and the beam splitter being bonded to the substrate (700) with the beam-splitting coatings down (712). In a next step, the glass substrate (710) is then thinned to the desired dimensions and an antireflective coating (714) is deposited on its upper surface. In alternative embodiments, apertures (720) may be filled with suitable sacrificial material such as wax or photoresist prior to bonding the glass substrate (710) to the support substrate. The sacrificial material may be applied by squeegee coating, inkjetting, or other suitable approach to achieve a filled aperture and planarized surface across the entire substrate. The sacrificial material will provide additional mechanical support to the glass substrate (710) and can be removed in a later processing step. According to one exemplary embodiment, the glass thickness is reduced to 10 μm.

In alternative embodiments, the glass substrate could be first coated with the anti-reflective coating (714) and bonded to the support substrate (700) with the anti-reflective coating (714) down. The beam-splitting coatings could then be deposited on the upper surface of the support substrate (700).

In a final step, the individual pellicle beam splitters (716) are singulated and released from the handler wafer (708). The individual pellicle beam splitters (716) can then be inserted where needed in optical systems under fabrication.

Figure 8:
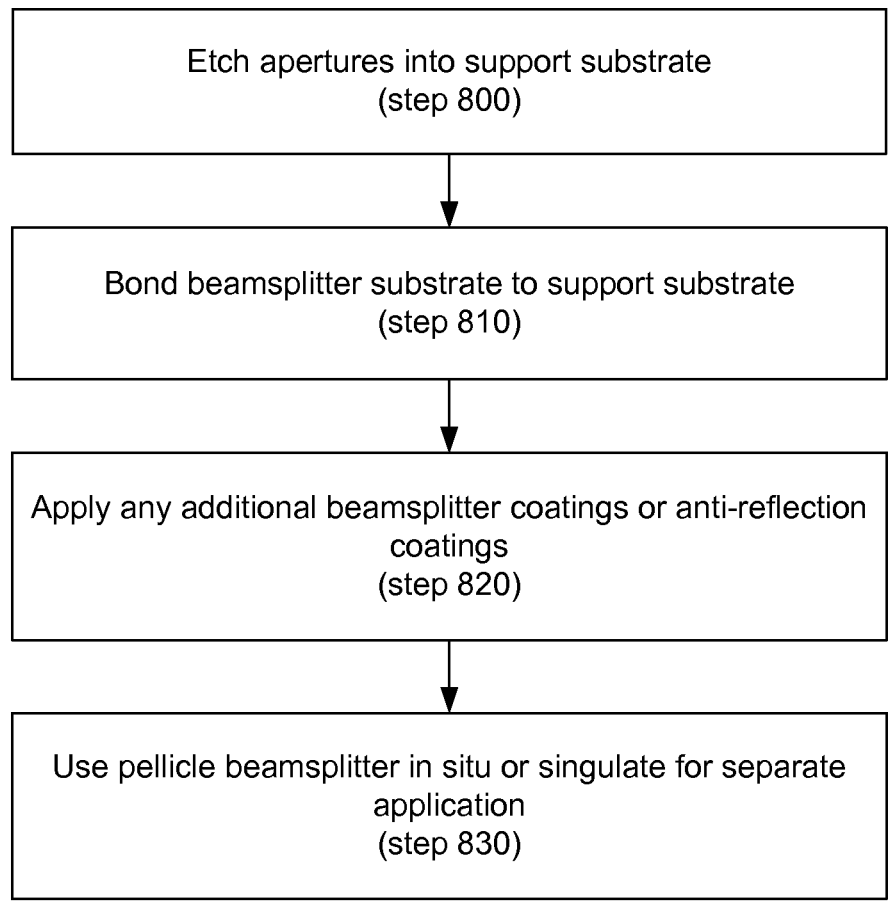
FIG. 8 is a flowchart showing an exemplary method of fabricating a pellicle beam splitter using lithographic processes, according to principles described herein.

FIG. 8 describes one exemplary method for creating pellicle beam splitters using lithographic processes. In a first step, the apertures are etched into a support substrate (step 800). A beam splitter substrate is then bonded to the support substrate (step 810). According to one exemplary embodiment, the beam splitter substrate may have one or more optical coatings prior to being bonded to the support substrate. Any additional optical coatings that are not already contained on the beam splitter substrate can then be applied (step 820). Following the completion of the individual pellicle beam splitters, the beam splitters can be used in situ or singulated into distinct components for use in separate applications (step 830).

Figure 9:
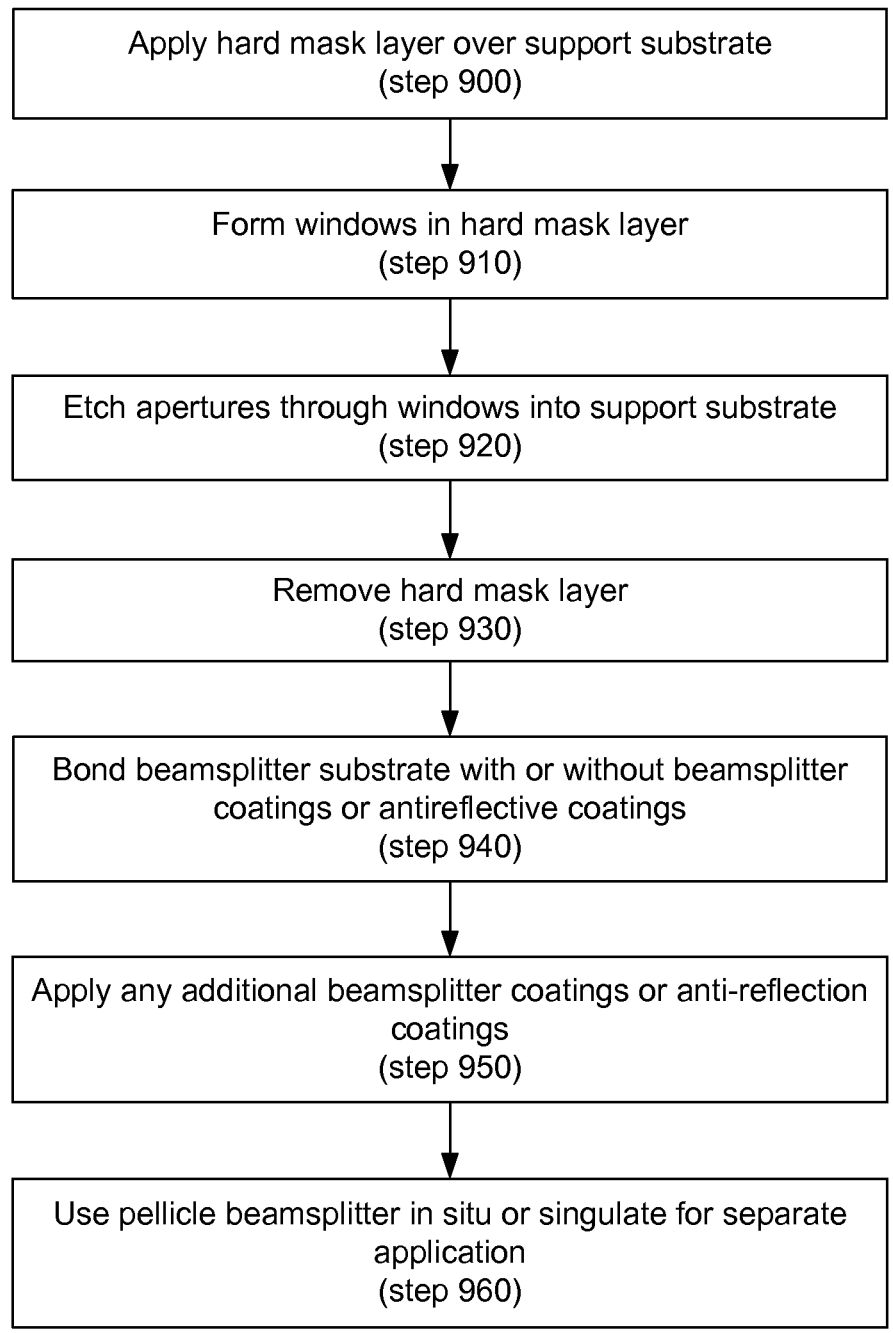
FIG. 9 is a flowchart showing an exemplary method of fabricating a pellicle beam splitter using lithographic processes, according to principles described herein.

FIG. 9 describes one illustrative method for creating pellicle beam splitters using lithographic processes. In a first step, a hard mask layer is applied over a support substrate (step 900). Using standard lithographic processes, such as photo masking and etching, windows are formed in the hard mask layer (step 910). Through the windows in the hard mask layers, apertures are etched into the support substrate (step 920). The hard mask layer is then removed (step 930). The beam splitter substrate is bonded to the support substrate (step 940). According to one exemplary embodiment, the beam splitter substrate can be bonded with or without beam-splitting coatings or antireflective coatings. The additional coatings can be applied after the bonding process is complete (step 950). The pellicle beam splitter can be created as an integral part of an integrated optical circuit or can be singulated for separate applications (step 960).

Figure 10:
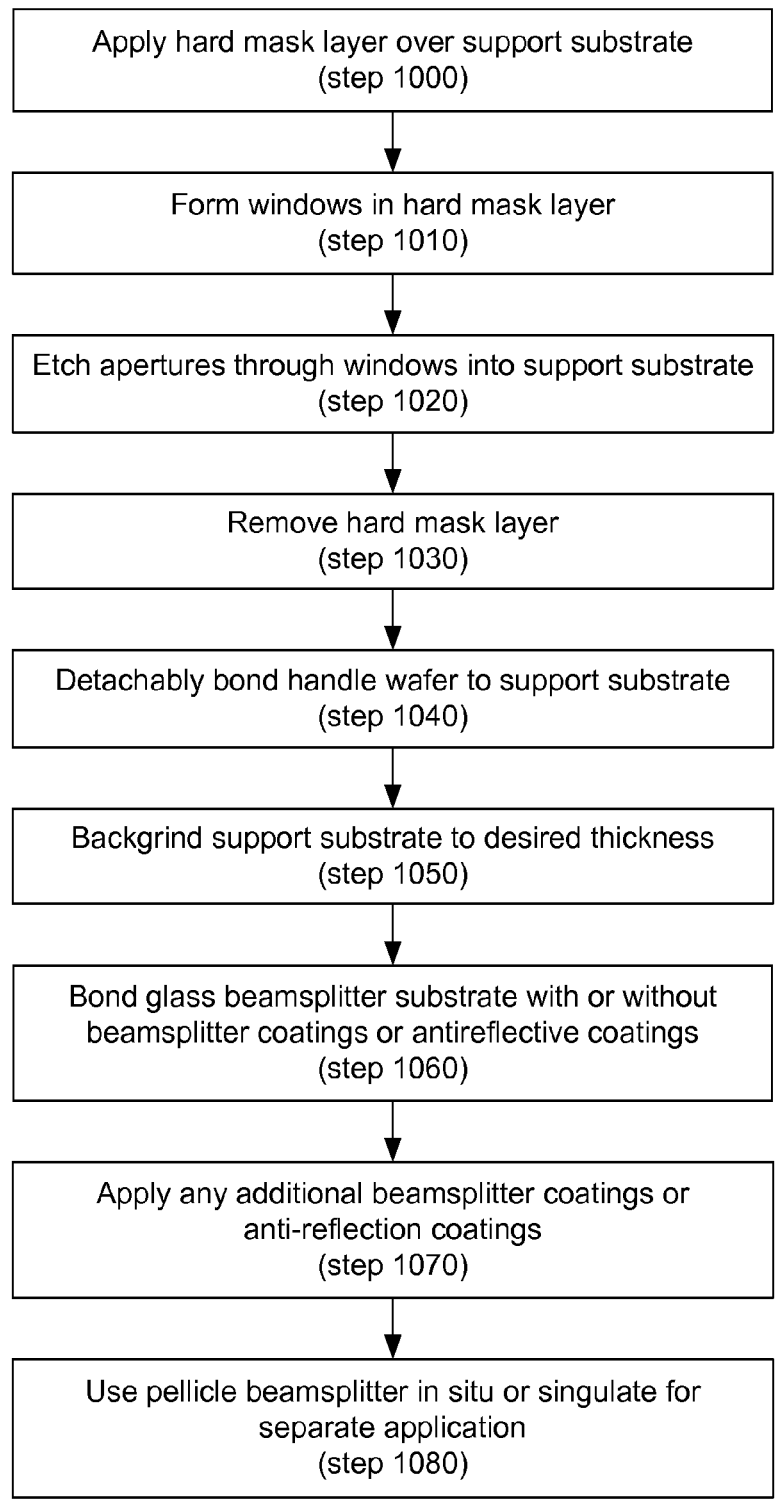
FIG. 10 is a flowchart showing an exemplary method of fabricating a pellicle beam splitter using lithographic processes, according to principles described herein.

FIG. 10 describes one illustrative method of creating pellicle beam splitters using standard lithographic processes. In a first step, a hard mask layer is applied over a support substrate (step 1000). Windows are formed in the hard mask layer (step 1010). Apertures are etched into the support substrate through the windows using a wet etch process (step 1020). The hard mask layer is then removed (step 1030). Next, the support substrate is detachably bonded to a handler wafer (step 1040). The support substrate is then background and/or chemically or mechanical polished to obtain the desired thickness and surface finish on the support substrate (step 1050). The glass beam splitter substrate is then bonded to the thinned support substrate (step 1060). According to one exemplary embodiment, the glass beam splitter substrate may have one or more beam splitting or antireflective coatings applied before it is bonded to the substrate. Any additional beam splitting coatings can be applied following the bonding process (step 1070). As described above, the pellicle beam splitter can be used in situ or singulated for separate applications (step 1080).

In sum, integrating proven beam splitter substrates on a micro-machined silicon frame achieve the temperature and mechanical stability required for many photonics applications. The uses of proven beam splitter substrates allows mature optical coating technology to be used, resulting in low polarization sensitive and minimal optical losses. The overall structure can be designed to be integrated in specific photonic systems. The designs presented may be particularly useful in an optical bus architecture where beam splitters are incorporated into a waveguide for signal routing.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A pellicle beam splitter comprising:
   a support substrate;
   a patterned substrate with an aperture, said patterned substrate being disposed on said support substrate; and
   a beam-splitting coating on said support substrate, wherein said beam-splitting coating is registered with and covering said aperture of said patterned substrate, said beam-splitting coating splitting an incident light beam into two perpendicular beams.

2. The pellicle beam splitter of claim 1, wherein said aperture does not pass through said support substrate, said support substrate being at least partially transparent at a target optical wavelength.

3. The pellicle beam splitter of claim 1, wherein said beam-splitting coating is deposited directly on a first side of said support substrate.

4. The pellicle beam splitter of claim 1, wherein patterned substrate is bonded to said support substrate.

5. The pellicle beam splitter of claim 3, further comprising an antireflection coating, said antireflection coating, being deposited on a second side of said support substrate.

6. The pellicle beam splitter of claim 1, wherein said aperture has a tapered geometry, said aperture having a first larger opening and a second smaller opening, said second smaller opening being on a side of said patterned substrate closest to said support substrate.

7. The pellicle beam splitter of claim 1, wherein said beam-splitting coating is disposed between said support substrate and said patterned substrate.

8. The pellicle beam splitter of claim 1, further comprising an anti-reflective coating on said support substrate, said anti-reflective coating also being registered with and covering said aperture of said patterned substrate.

9. The pellicle beam splitter of claim 8, wherein said beam-splitting coating is on a first side of said support substrate and said anti-reflective coating is on a second side of said support substrate and in said aperture of said patterned substrate.

10. The pellicle beam splitter of claim 1, wherein said support substrate and said patterned substrate are different portions of a single, unified substrate.

11. The pellicle beam splitter of claim 1, wherein said support substrate is a glass substrate and said patterned substrate is an etched silicon substrate.

12. A method of making the pellicle beam splitter of claim 1 comprising:
    forming said aperture in said patterned substrate, said patterned substrate being disposed on said support substrate; and
    depositing said beam-splitting coating on said support substrate, wherein said beam-splitting coating is registered with and covering said aperture of said patterned substrate, said beam-splitting coating splitting an incident light beam into two perpendicular beams.

13. A method for fabricating a pellicle beam splitter comprising:
    etching an aperture in a patterned substrate;
    bonding a beam splitter substrate to an upper surface of said patterned substrate, said beam splitter substrate covering said aperture; and
    depositing at least one optical beam-splitting coating on said beam splitter substrate, wherein said beam-splitting coating is registered with and covering said aperture of said patterned substrate, said beam-splitting coating splitting an incident light beam into two perpendicular beams.

14. The method of claim 13, further comprising:
    applying a hard mask layer over said patterned substrate;
    forming a window in said hard mask layer; and
    etching said aperture through said window.

15. The method of claim 14, further comprising removing said hard mask layer and resurfacing said upper surface of said patterned substrate.

16. The method of claim 13, further comprising:
    detachably bonding a handle wafer to said patterned substrate;
    removing material from said support substrate to reduce a dimension of said patterned substrate.

17. The method of claim 13, wherein an antireflection coating is deposited after said beam splitter substrate is bonded to said patterned substrate.

18. A method of fabricating a pellicle beam splitter on a unified substrate comprising:
    depositing a beam splitter layer on said unified substrate, said unified substrate being optically transmissive at a target optical wavelength, said unified substrate further being configured to provide structural support to said beam splitter layer;
    etching said unified substrate to create an indentation in said unified substrate, said indentation having a bottom surface, an antireflective coating being applied to said bottom surface.

19. A pellicle beam splitter comprising:
    a support substrate;
    a patterned substrate with an aperture, said patterned substrate being disposed on said support substrate;
    a beam-splitting coating on said support substrate, wherein said beam-splitting coating is registered with and covering said aperture of said patterned substrate, said beam-splitting coating splitting an incident light beam into two perpendicular beams; and
    an anti-reflective coating on said support substrate, said anti-reflective coating also being registered with and covering said aperture of said patterned substrate;
    wherein said anti-reflective coating is on a first side of said support substrate and said beam-splitting coating is on a second side of said support substrate and in said aperture of said patterned substrate.

20. A pellicle beam splitter comprising:
    a support substrate;
    a patterned substrate with an aperture, said patterned substrate being disposed on said support substrate;
    a beam-splitting coating on said support substrate, wherein said beam-splitting coating is registered with and covering said aperture of said patterned substrate, said beam-splitting coating splitting an incident light beam into two perpendicular beams; and
    an anti-reflective coating on said support substrate, said anti-reflective coating also being registered with and covering said aperture of said patterned substrate;

wherein said anti-reflective coating and said beam-splitting coating are disposed on opposite sides of said support substrate, further wherein one of said anti-reflective coating and said beam-splitting coating is disposed between said support substrate and said patterned substrate.

* * * * *